United States Patent
Kasuya

(10) Patent No.: US 7,556,135 B2
(45) Date of Patent: Jul. 7, 2009

(54) PARKING MECHANISM FOR A TRANSMISSION

(75) Inventor: Koji Kasuya, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 0 days.

(21) Appl. No.: 12/078,017

(22) Filed: Mar. 26, 2008

(65) Prior Publication Data

US 2008/0236988 A1    Oct. 2, 2008

(30) Foreign Application Priority Data

Mar. 27, 2007    (JP)    ............... 2007-082251

(51) Int. Cl.
  *B60T 1/06*    (2006.01)
  *F16H 63/34*    (2006.01)
(52) U.S. Cl. ................. 192/219.5; 74/411.5; 74/577 S; 188/31
(58) Field of Classification Search ............... 192/219.5
  See application file for complete search history.

(56) References Cited

U.S. PATENT DOCUMENTS 2,974,752 A * 3/1961 Howard ................. 188/69
4,907,681 A * 3/1990 Kuusik et al. ........... 192/219.5
5,685,406 A * 11/1997 Crum et al. ............. 192/219.5
6,354,422 B1 * 3/2002 Kim ....................... 192/219.5

FOREIGN PATENT DOCUMENTS

| DE | 10144056 A1 | * 3/2003 |
| JP | 3-029747 U | 3/1991 |
| JP | 2002-178891 A | 6/2002 |

* cited by examiner

*Primary Examiner*—Richard M. Lorence
(74) *Attorney, Agent, or Firm*—Birch, Stewart, Kolasch & Birch, LLP.

(57) ABSTRACT

A parking mechanism of a transmission includes a parking sprocket plug having a pawl portion to be engaged with a parking gear, a parking rod which has a bulge portion and causes the parking sprocket plug to operate, and a bracket which has a rod support member supporting the parking rod. The parking sprocket plug also has a support piece. When the bulge portion is disengaged from a projection, the support piece is hooked on the bulge portion, and the parking sprocket plug is supported in a position where the pawl portion is disengaged from the parking gear. Thereby, a parking mechanism which incurs no malfunction and requires small force for operation is provided.

10 Claims, 3 Drawing Sheets

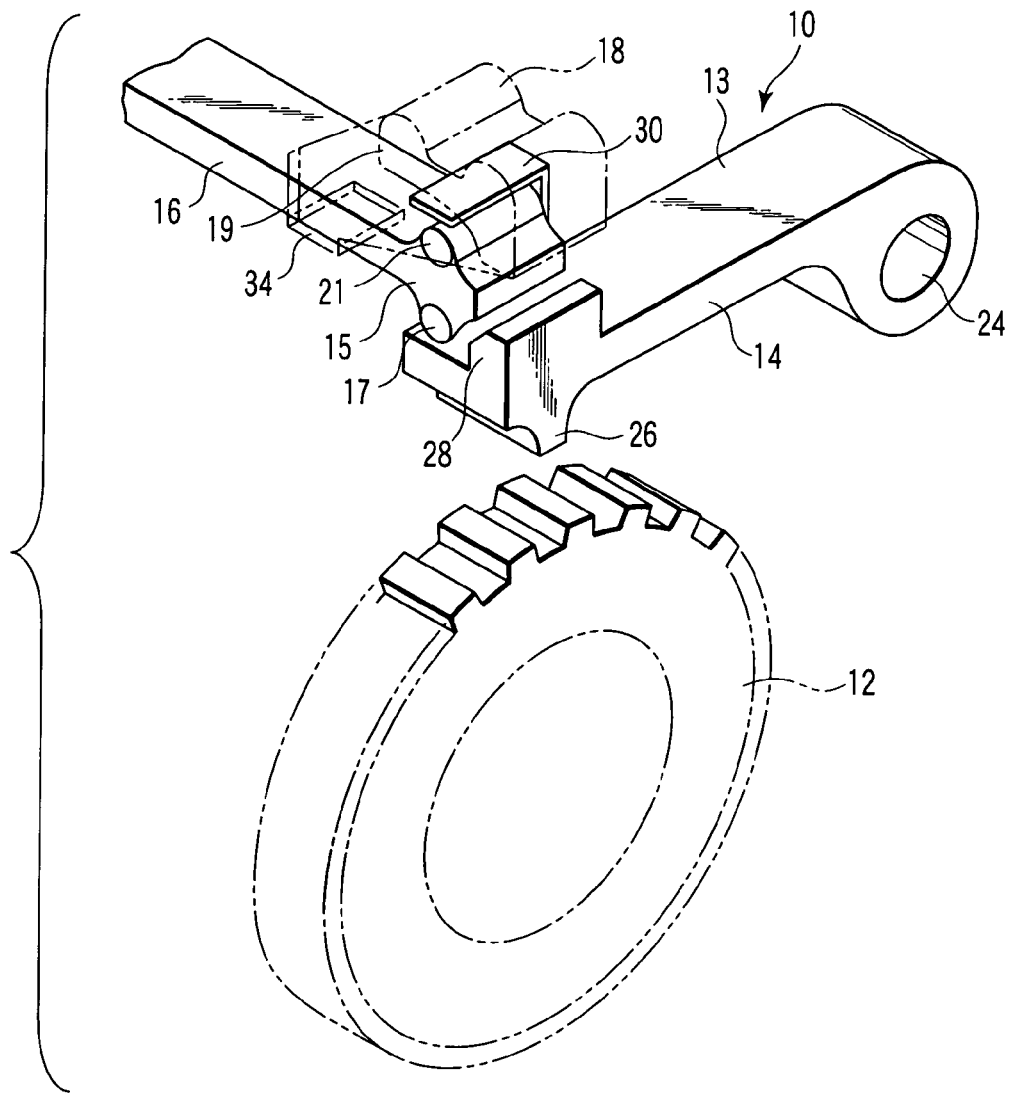
F I G. 1
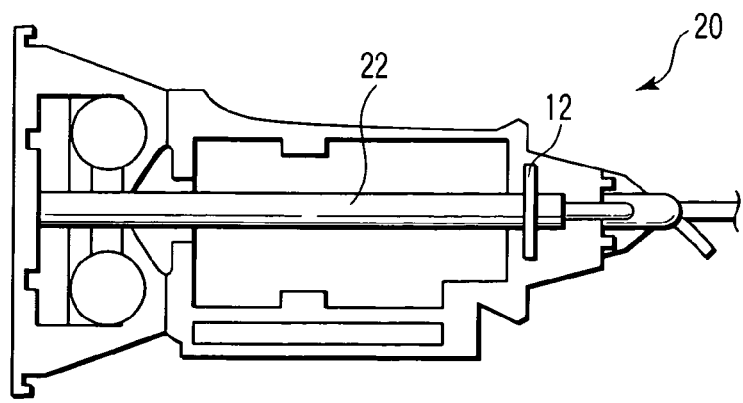
F I G. 2

PARKING MECHANISM FOR A TRANSMISSION

CROSS-REFERENCE TO RELATED APPLICATIONS

This application is based upon and claims the benefit of priority from prior Japanese Patent Application No. 2007-082251, filed Mar. 27, 2007, the entire contents of which are incorporated herein by reference.

BACKGROUND OF THE INVENTION

1. Field of the Invention

This invention relates to a parking mechanism placed in a transmission.

2. Description of the Related Art

Generally, automatic transmissions are equipped with a parking mechanism inside thereof. The parking mechanism is formed of a parking gear, a parking sprocket plug, and a parking rod, etc. The parking gear is connected to an output shaft of the transmission. The parking sprocket plug has a pawl portion to be engaged with the parking gear.

When the transmission is set to a parking range by operation of a shift control lever, the parking rod oscillates the parking sprocket plug, and the pawl portion is engaged with the parking gear. Thereby, the output shaft of the transmission is fixed by the parking sprocket plug, and the axle shaft of the parking vehicle is fixed.

On the other hand, there are cases where the parking sprocket plug is provided with a return spring and/or a weight. These return spring and the weight urge the parking sprocket plug in a direction away from the parking gear. Jpn. Pat. Appln. KOKAI Pub. No. 200-178891discloses an example in which a weight is used for a parking sprocket plug.

However, when the urging force by the return spring and the weight is weak, the parking sprocket plug may be oscillated by vibration of the like, and may be accidentally engaged with the parking gear. On the other hand, if the spring force is increased, the power necessary for operating the parking sprocket plug is increased, and operation of the shift control lever requires much force.

Further, even when the parking sprocket plug is equipped with a weight, a return spring is also provided to suppress oscillation caused by vibration. Therefore, both weight of the weight and spring force of the return spring act on the parking sprocket plug, and there is the fear that operation of the shift control lever requires much force, and that a large force is applied on the parking mechanism.

SUMMARY OF THE INVENTION

An object of the present invention is to provide a parking mechanism for a transmission, which solves the above problem, prevents malfunction, and realizes easy operation of the shift control lever.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of an embodiment of a parking mechanism according to the present invention.

FIG. 2 is a block diagram of a transmission.

DETAILED DESCRIPTION OF THE INVENTION

Figure 3:
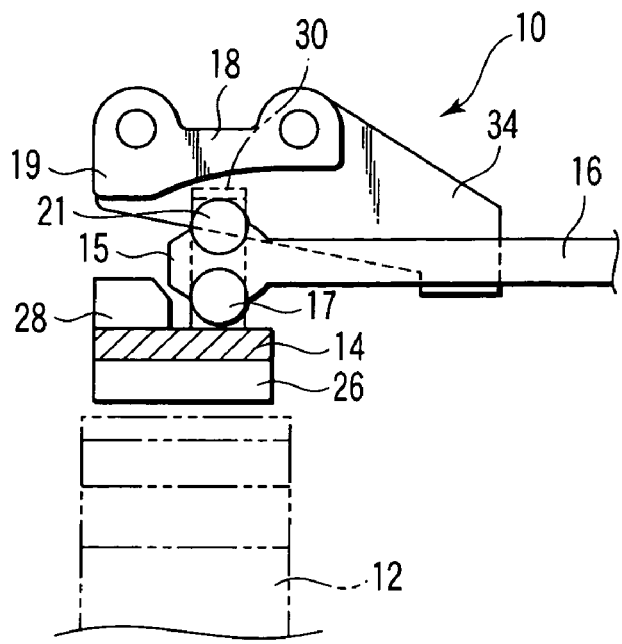
FIG. 3 is a front view of the parking mechanism illustrated in FIG. 1.

An embodiment of a parking mechanism according to the present invention is described below with reference to drawings.

FIG. 1 illustrates a structure of the parking mechanism. Parking mechanism 10 comprises a parking gear 12, a parking sprocket plug 14, a parking rod 16, and a bracket 18, etc. The parking gear 12 is fixed onto a drive shaft 22 of a transmission 20, as illustrated in FIG. 2. For example, the parking gear 12 is fixed as one unitary piece on one end of the drive shaft 22 by spline fitting. The parking mechanism 10 is provided above the parking gear 12 inside the transmission 20, although not shown in FIG. 2.

The bracket 18 is attached to a housing of the transmission 20. The housing indicates a member formed as one unitary piece with the transmission 20, or a member fixed as one unitary piece to the transmission 20. The bracket 18 has a top plate 19. The top plate 19 is formed to have a canopy shape. The bottom surface of the top plate 19 is slightly inclined such that the left side of the bottom surface is lowered as illustrated in FIG. 3.

Further, the bracket 18 is provided with an L-shaped rod support member 34. The rod support member 34 supports a lower side surface of the parking rod 16 such that the parking rod 16 can move back and forth in the axial direction of the parking rod 16. Thereby, the parking rod 16 is supported in an almost horizontal state, with the space with the parking gear 12 maintained almost constant.

The parking rod 16 is a rod-shaped member, and has a bulge portion 15 at its distal end. The bulge portion 15 includes an engagement projecting portion 17, and a receding projecting portion 21. The engagement projecting portion 17 projects to the parking sprocket plug 14 side, and the receding projecting portion 21 projects to a side opposite to the parking sprocket plug 14, that is, the bracket 18 side.

A wire extending from a shift control lever (which are not shown) is connected to an axial end portion of the parking rod 16. For example, when the shift control lever is set to a parking range, the parking rod 16 is set to a predetermined forward position (hereinafter referred to as "forward position") in the axial direction of the parking rod 16 by the wire. Further, when the shift control lever is set to a range other than the parking range, the parking rod 16 is set to a predetermined backward position (hereinafter referred to as "backward position") by the wire.

The engagement projecting portion 17 has a predetermined height width in the vertical direction. When the parking sprocket plug 14 is set to the forward position, the engagement projecting portion 17 is inserted between the top plate 19 and the parking sprocket plug 14. Thereby, the engagement projecting portion 17 abuts against a projection 28 described later, and the parking sprocket plug 14 is oscillated.

On the other hand, when the parking sprocket plug 14 is set to the predetermined backward position, abutment between the engagement projecting portion 17 and the projection 28 is released, and the receding projecting portion 21 is engaged with a support piece 30 described later.

The parking rod 16 is connected to the shift control lever through a cushioning member such as a spring member (not shown). Thereby, the parking rod 16 is moved forward in wait for oscillating operation of the parking sprocket plug 14. The bulge portion 15 may be provided movably in the axial direction of the parking rod 16. Further, the bulge portion 15 may be provided with a spring member or the like, and urged forward by the spring member.

As illustrated in FIG. 1, an attaching hole 24 is provided at one end of the main body portion 13 of the parking sprocket plug 14. The parking sprocket plug 14 is oscillatably attached inside the transmission 20, by running an attaching shaft (not shown) extending from the housing of the transmission 20 through the attaching hole 24. Further, a pawl portion 26, the projection 28, and the support piece 30 which serves as an engaging portion are provided on the other end side of the parking sprocket plug 14 opposite to the attaching hole 24.

The parking sprocket plug 14 is set to be oscillated within a plane including the parking gear 12. Further, the forward and backward directions of the parking rod 16 and the oscillating direction of the parking sprocket plug 14 are set to be almost perpendicular to each other. The parking sprocket plug 14 is provided with a return spring (not shown). By the return spring, the parking sprocket plug 14 is urged in the right direction in FIG. 1, that is, a direction in which the pawl portion 26 moves away from the parking gear 12, in other words, a direction of the receded position.

The pawl portion 26 is provided on the lower side surface of the parking sprocket plug 14, that is, the parking gear 12 side. The pawl portion 26 is formed to have a shape to be engaged with teeth of the parking gear 12.

The projection 28 is provided on a surface opposite to the surface on which the pawl portion 26 is provided. The projection 28 is formed to abut against the engagement projecting portion 17 when the parking rod 16 is moved forward, as described above. Further, the projection 28 is formed to have a sufficient height to oscillate the parking sprocket plug 14 such that the pawl portion 26 is engaged with the parking gear 12, when the projection 28 abuts against the engagement projecting portion 17.

Figure 4:
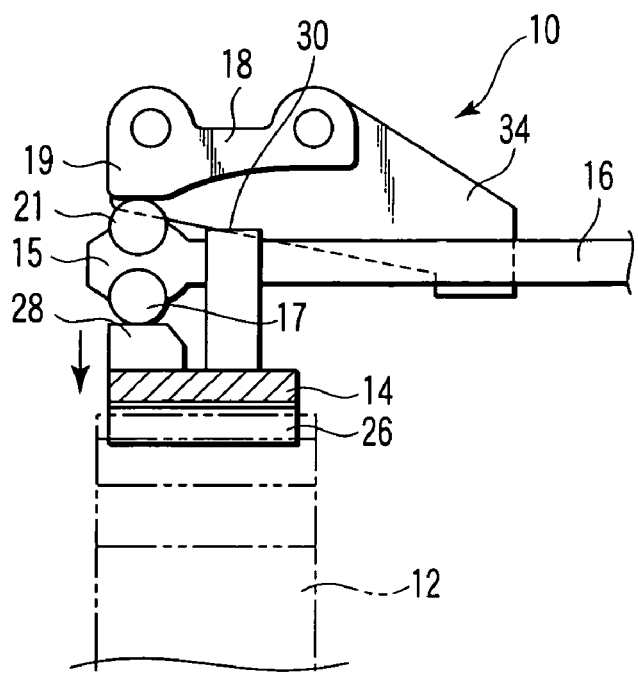
FIG. 4 is another front view of the parking mechanism illustrated in FIG. 1.

The support piece 30 is a metal piece having an inverted L shape, and attached to the main body portion 13 of the parking sprocket plug 14. The support piece 30 is attached to the same surface as that on which the projection 28 is attached. When the parking rod 16 is set to the backward position as illustrated in FIG. 3, the support piece 30 is engaged with the receding projecting portion 21 of the parking rod 16. Further, the support piece 30 is formed to have a width (in the axial direction of the parking rod 16) such that the receding projecting portion 21 is entirely disengaged from the support piece 30 when the parking rod 16 is set to the forward position as illustrated in FIG. 4. In FIG. 3, the support piece 30 is illustrated by a chain double-dashed line, for convenience of illustration.

Specifically, in the state where the parking rod 16 is in the backward position, the support piece 30 is engaged with the receding projecting portion 21. Thereby, the parking sprocket plug 14 is supported in a position where the pawl portion 26 of the parking sprocket plug 14 is entirely raised from the parking gear 12. Further, when the parking rod 16 is moved to the forward position, the support piece 30 is disengaged from the receding projecting portion 21 as illustrated in FIG. 4. Simultaneously, the receding projecting portion 21 contacts the bottom surface of the bracket 18, the engagement projecting portion 17 presses the projection 28, and the pawl portion 26 is engaged with the parking gear 12.

Even when the parking rod 16 is urged in the forward direction by the shift control lever, the parking rod 16 or the bulge portion 15 waits just before the projection 28 by the action of the cushion member such as a spring (not shown), until the pawl portion 26 is engaged between teeth of the parking gear 12. Then, when the pawl portion 26 is engaged with the parking gear 12, the parking rod 16 is moved forward.

Next, operation of the parking mechanism 10 is explained.

When the shift control level is set to the drive range while the vehicle is running, the parking rod 16 is in the backward position as illustrated in FIG. 3. Therefore, the parking rod 16 is held by the rod support member 34, and the support piece 30 is hooked on the receding projecting portion 21. Thereby, the parking sprocket plug 14 is raised above the parking gear 12, that is, to the receded position, and the pawl portion 26 is not engaged with the parking gear 12.

The parking sprocket plug 14 is supported by the receding projecting portion 21 of the support piece 30, and thus is not oscillated even if the spring force of the return spring is weak. Therefore, even when vibration occurs during driving of the vehicle, no malfunction occurs, such as accidental engagement of the parking sprocket plug 14 with the parking gear 12.

Figure 5:
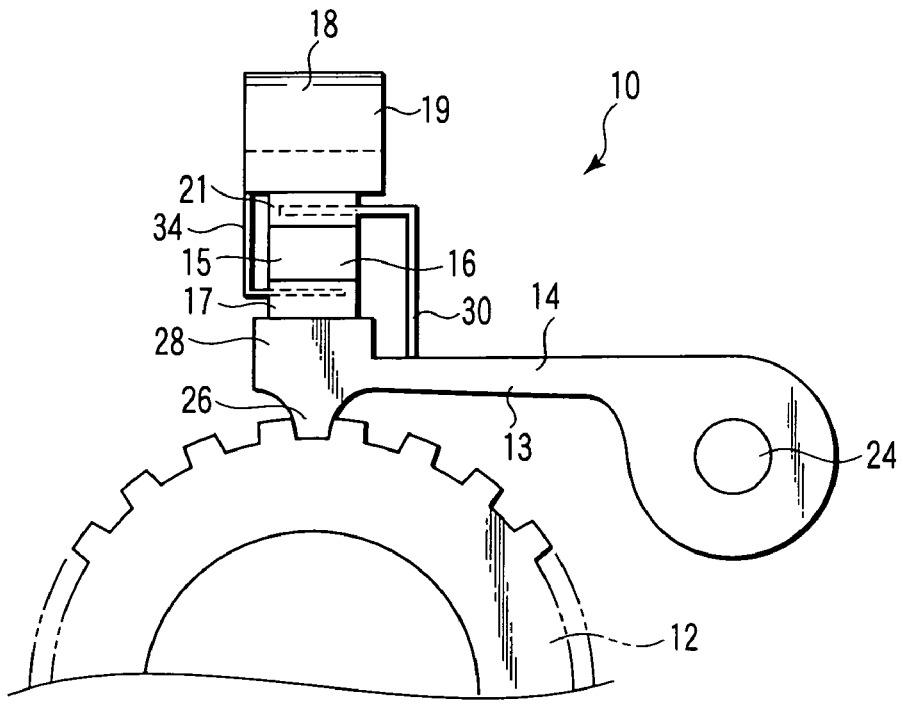
FIG. 5 is a side view of the parking mechanism illustrated in FIG. 1.

When the shift control lever is set to the parking range, the parking rod 16 is moved to the forward direction as illustrated in FIG. 4. Then, the support piece 30 is disengaged from the receding projecting portion 21, the receding projecting portion 21 moves along the bottom surface of the bracket 18, and simultaneously the engagement projecting portion 17 abuts against the projection 28 and pushes down the projection 28. Thereby, the parking sprocket plug 14 is oscillated downward against the return spring. Then, the parking sprocket plug 14 is engaged with the parking gear 12, and the transmission 20 is set to the parking state. FIG. 5 illustrates a state in which the transmission 20 is set to the parking state. As illustrated in FIG. 5, the pawl portion 26 is engaged with the parking gear 12, and the parking sprocket plug 14 is engaged with the parking gear 12 with reliability. Thereby, the drive shaft 22 of the transmission 20 is fixed, and the vehicle is held in the stopped state.

When the shift control lever is operated again and set to the drive range, the parking sprocket plug 14 is supported by the receding projecting portion 21, and thus is not oscillated, and malfunction can be prevented. Further, in the parking mechanism 10, since it is unnecessary to attach a return spring having a strong spring force to the parking sprocket plug 14, the parking rod 16 can be easily moved, and operation of the shift control lever only requires small force. Furthermore, the parking sprocket plug 14 and the bracket 18 are provided with the support piece 30 and the rod support member 34. Thereby, the parking mechanism 10 can be formed with a simple mechanism without using complicated members.

The present invention is not limited to the above embodiment, but can be carried out with various modifications within the range not departing from the gist of the invention. For example, although the above embodiment is explained with the transmission 20 illustrated in FIG. 2, the transmission in which the parking mechanism 10 is placed is not limited to the above transmission.

Figure 6:
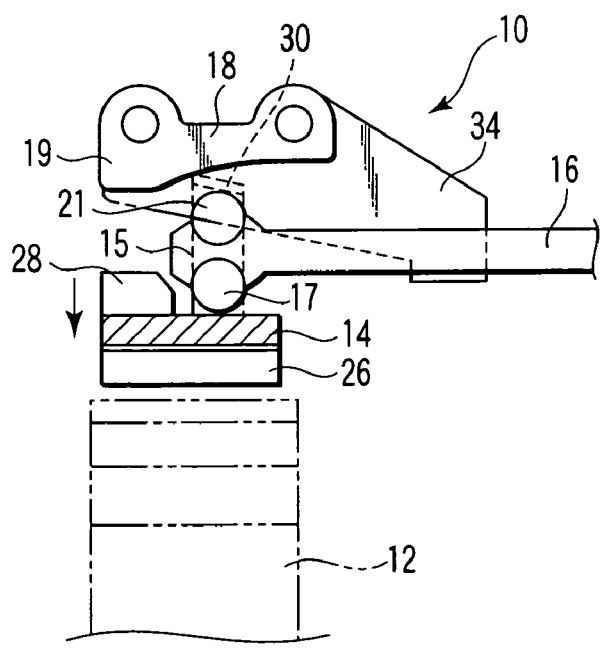
FIG. 6 is a front view illustrating another example of the parking mechanism.

FIG. 6 illustrates another example of the support piece 30. In this example, an upper portion of the support piece 30 is inclined along the axial direction of the parking rod 16. Specifically, the backward position side of the upper portion of the support piece 30 is lowered. According to this structure, when the parking rod 16 is moved in the backward direction, the receding projecting portion 21 is brought into close contact with the upper portion of the support piece 30, and the parking sprocket plug 14 is fixed without wobbling.

Further, the engagement projecting portion 17 and the receding projecting portion 21 may be provided with a roller, and the roller may be rotated with forward and backward movement of the parking rod 16. Thereby, the parking rod 16 is smoothly moved, and the shift control lever can be operated with more agility.

Furthermore, the projection 28 may not be formed on one side of the width direction of the main body portion 13 of the parking sprocket plug 14. For example, the projection 28 may be formed in the center of the width direction of the main body portion 13.

Further, the engagement projecting portion 17 may be formed to abut against the projection 28 when the parking rod 16 is moved to the backward position. Furthermore, the parking mechanism 10 is not always provided above the parking gear 12, but may be provided at the side of or under the parking gear 12.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A parking mechanism for a transmission, comprising:
   a parking gear provided in the transmission;
   a parking sprocket plug having a main body oscillatably attached inside the transmission and a pawl portion which is provided on the main body and to be engaged with the parking gear, the parking sprocket plug being movable between an engagement position in which the pawl portion is engaged with the parking gear and a receded position in which the pawl portion is receded from the parking gear; and
   a parking rod which is movable back and forth in an axial direction thereof and causes the parking sprocket plug to operate,
   wherein the parking rod has an engagement projecting portion which projects to a side on which the parking sprocket plug is provided, and a receding projecting portion which projects to a side opposite to the engagement projecting portion,
   the parking sprocket plug has a projection which abuts against the engagement projecting portion when the parking rod moves to one of forward and backward directions, and an engaging portion which is disposed to hold the parking rod between the engaging portion and the main body and engaged with the receding projecting portion when the parking rod moves to the other of the forward and backward directions,
   the projection is configured to hold the parking sprocket plug in the engagement position in a state of abutting against the engagement projecting portion, and
   the engaging portion is configured to hold the parking sprocket plug in the receded position in a state of being engaged with the receding projecting portion.

2. A parking mechanism according to claim 1, wherein
   the engaging portion extends from a main body portion of the parking sprocket plug to wrap around the parking rod, and abuts against the receding projecting portion on a surface opposed to the main body portion.

3. A parking mechanism according to claim 1, wherein
   the parking sprocket plug is oscillatably supported, and a side of the parking sprocket plug having the pawl portion serves as an oscillating end side.

4. A parking mechanism according to claim 1, wherein
   the parking sprocket plug pushes down the pawl portion in a gravitational direction and causes the pawl portion to be engaged with the parking gear.

5. A parking mechanism according to claim 1, further comprising:
   a rod support member which holds the parking rod such that the parking rod is movable in the forward and backward directions, and holds the parking rod at an almost fixed distance from the parking gear.

6. A parking mechanism according to claim 1, wherein
   the moving directions of the parking rod are set almost perpendicular to a moving direction of the pawl portion.

7. A parking mechanism according to claim 1, wherein
   the parking mechanism is provided above the parking gear in the transmission.

8. A parking mechanism according to claim 1, wherein
   a circumferential surface of at least one of the engagement projecting portion and the receding projecting portion is formed to have a curved shape.

9. A parking mechanism according to claim 1, wherein
   at least one of the engagement projecting portion and the receding projecting portion is provided with a roller which contacts the projection or the engaging portion.

10. A parking mechanism according to claim 1, wherein
    at least one of the projection and the engaging portion has an inclined surface which is incline along the forward and backward directions of the parking rod.

* * * * *